March 21, 1967  R. W. GRETTER  3,310,213
CABLE ENGINE

Filed April 7, 1965  6 Sheets-Sheet 1

INVENTOR
*R. W. GRETTER*
BY
ATTORNEY 3,310,213
CABLE ENGINE
Ralph W. Gretter, Mountainville, N.J., assignor to Bell Telephone Laboratories, Incorporated, New York, N.Y., a corporation of New York
Filed Apr. 7, 1965, Ser. No. 446,336
3 Claims. (Cl. 226—172)

This invention relates to a machine for placing cable under water and more particularly, to a linear cable engine for shipboard use in placing telephone or other types of electrical cable under the ocean.

The purpose of a shipboard cable engine is to assist in the placement of underwater cable by controlling the rate at which the cable is paid out from the ship. Large quantities of what is commonly called armorless submarine cable are being used for transoceanic cable. This cable has the strength member in the center of the cable and has as its outer protection a polyethylene sheath. As compared to the steel jacketed armored cable, the armorless cable is delicate and easily damage if not handled properly. Inasmuch as the strength member is located at the cable center, the laying forces must be transferred to the strength member through the polyethylene sheath.

The ship carries the cable in large cylindrical holds called tanks. The purpose of the cable engine is to control the pay-out of the cable from the tanks over the side of the ship. It is desirable when the ship is in very shallow water to be able to pay out slack in the cable. This requires the cable engine to be able to pull the cable out of the tanks and eject it over the side of the ship at a controlled rate depending upon the speed of the ship and the water depth.

As the water gets deeper and the length of the cable hanging over the side of the ship gets longer, the function of the engine may tend to reverse. This reversal of function is caused by the fact that the weight of the cable hanging over the side of the ship becomes large enough to overcome the internal resistance of the engine and pull the cable from the tanks. The engine must therefore be able to resist the suspended weight of the cable to prevent the haphazard pulling of the cable from the storage tanks.

Thus, the ideal cable engine must be able to pay out cable in very shallow water and resist the pulling of the cable from the tanks in deeper water in order to lay the cable in conformity with the contours of the underwater ground.

For signal transmission purposes, the continuity of the cable is interrupted at approximately twenty-mile lengths by electrical amplifiers which are called repeaters. The repeaters are elongated, cigar-shaped objects many times larger in diameter than the cable. The repeater housing is metal and inflexible. The cable engines must be designed to handle or pass the repeaters as the cable is being paid out if efficiency in cable laying is to be obtained.

In deep water, the combined weight of the suspended cable and repeaters becomes quite large. The forces resulting from this suspended weight must be applied over a large length of the cable if it is not to be damaged. Total failure or permanent deformation of the cable can result if the forces created by the suspended cable and repeaters are applied to a relatively short length of cable. Such deformation can change electrical properties of the cable which are detrimental to the system.

In order to overcome these problems, the cable engines known in the prior art have been generally very long, large, and heavy. One type of engine known is the dual tractor-tread engine. This engine comprises the mounting of one tractor tread upon a second tractor tread such that the cable is squeezed between the two treads. The treads include enough slack and are mounted so that they will move apart and pass or swallow a cable repeater as it approaches and goes through the engine. This requires considerable tread slack and the treads must be able to move apart from each other a sufficient distance in order to allow for the passage of the repeater through the engine.

A second type of cable engine known in the prior art is the drum-type engine. This type of engine is essentially a large drum upon which sufficient turns of the cable are wrapped about the drum to withstand any forces that are applied to the cable. The problems encountered with this type of engine are considerable. For example, it is extremely difficult to lay slack with this type of an engine in very shallow water. In drum-type engines, outboard tension in the cable is required to make the cable conform to the circumference of the drum so that the driving power of the engine can be transmitted to the cable. If outboard tension is required, the engine cannot be used for laying slack in very shallow water because the outboard tension in the cable will be insufficient to make the cable conform to the drum circumference.

The use of a drum-type engine introduces further problems. As previously mentioned, underwater cable includes a cable repeater approximately every twenty miles of cable length. If a drum-type engine is to be used, the repeater housing must be designed, by including gimbals or universal type joints, so that the repeaters and their adjoining lengths of cable may be wound around the drum circumference without damaging adjacent lengths of cable.

In addition, the presence of the repeaters increases the cable handling problems. Since the repeaters are many times larger in diameter than the cable and in view of the relatively delicate nature of the cable, there is considerable danger that when a repeater is wound upon the drum it will damage the turns of cable adjacent to the repeater. This danger is increased as the cable turns are moved longitudinally along the drum during laying operations.

The laying of underwater cable with repeaters requires auxiliary equipment to assist in the cable handling if a drum-type engine is used. Known processes for laying cable with drum-type engines include such steps as taking the turns of cable off the drum and supplementing the first engine with the use of a second engine. Such processes generally require a stoppage or slowing down in cable laying each time a repeater is encountered, or approximately every twenty miles of cable length.

Any stoppage or delay in the cable laying process allows the cable ship to drift, increases navigation problems, and may result in an inaccurate cable laying path. In addition, the amount of cable needed for proper slack due to changes in ground contour becomes difficult to determine. Any of the above effects are undesirable because they unnecessarily increase the cost of the system by reducing the efficiency of its placement.

These disadvantages and problems are overcome by the invention which, in its illustrative embodiment comprises a linear cable engine of a single tractor-type track. The latter includes a plurality of buckets that are driven about the track by means of roller chain. Each bucket includes a depressible cradle, the depression of which is resisted by springs. Each cradle further includes means for gripping a cable which in the illustrative embodiment includes inflatable boots that may be forced against the cable by means of hydraulic pressure.

Also mounted on each bucket is a hydraulic actuating cylinder. The cylinders are in turn interconnected with the cable gripping means. The cylinders are adapted to automatically actuate the gripping means so that the cable will be gripped and released at appropriate times.

The spring loading of each cradle is of such a magnitude that when the weight of a repeater is placed upon the top of each cradle, the cradle will be depressed into the bucket allowing the repeater to pass through the machine laying on top of the track without destroying the gripping pressure of the adjacent gripping means.

The embodiment of the invention thus provides a linear cable engine having sufficient gripping length to handle polyethylene sheathed underwater armorless cable without imposing stresses upon the cable that are large enough to damage it. The machine also is adapted to handle or pass repeaters without requiring a slow down, stoppage in cable laying or requiring a second machine.

A failure of any individual gripping means will not require the immediate shut-down of the engine for repair. This feature allows repairs to be made at a more convenient and economical time.

In addition, the embodiment of the invention incorporates two separate and distinct motions. One motion of the engine is used for cable handling, namely the actuation of the gripping means. The second motion of the engine is used for repeater handling, namely the depressing of the cradles. This means that small displacements of the gripping means will be sufficient to grip the cable and the relatively larger displacements of the cradles need occur only when a repeater is passed through the engine. The second motion will therefore be limited to approximately every twenty miles of cable laid.

As a further advantage, the engine may operate a majority of the time as if the cable being laid did not include repeaters. When a repeater does approach the engine, it can pass through without delay or stoppage and without programming the engine for repeater intervals.

The invention will be better understood and its advantages and features will be more readily apparent upon the study of the following detailed description of the illustrative embodiment when it is read in conjunction with the drawing, in which.

Figure 1:
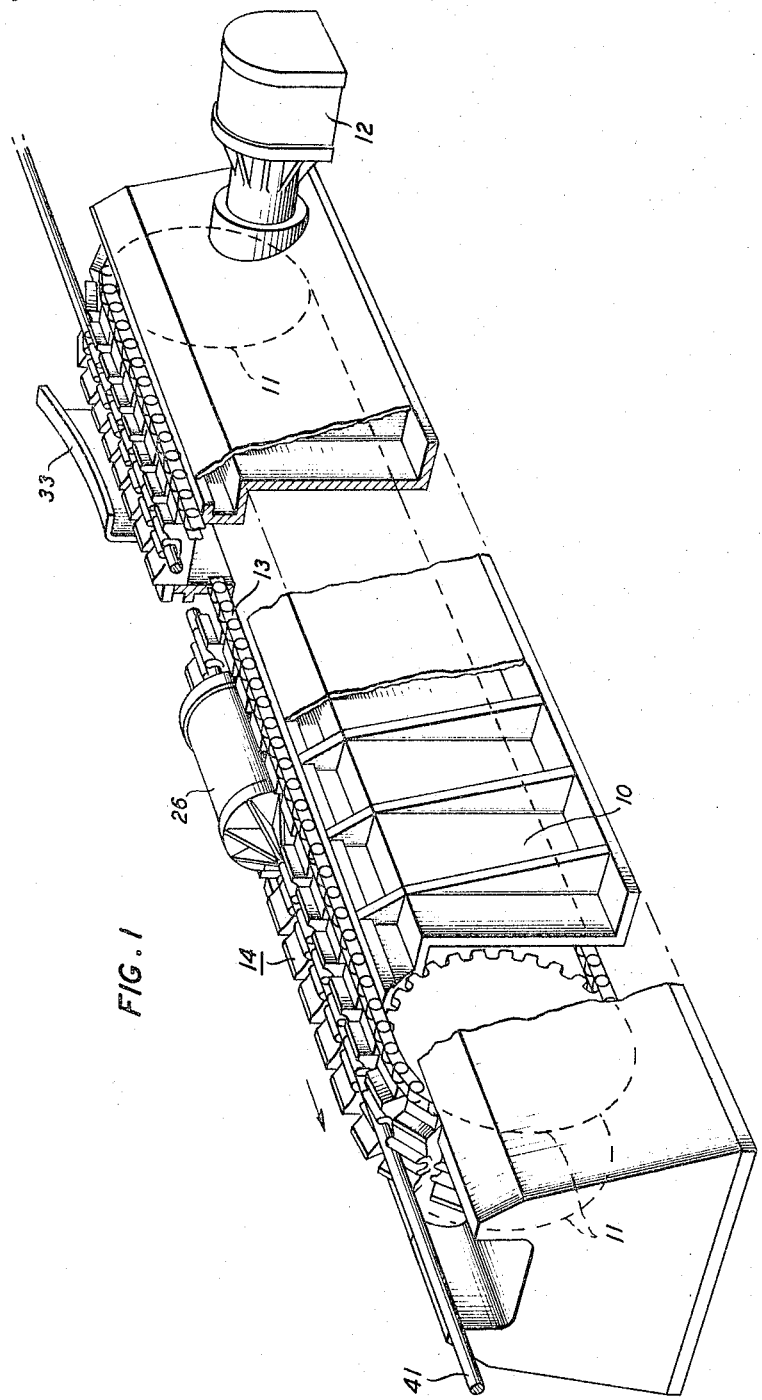
FIG. 1 is an over-all view of an illustrative embodiment of the invention.

In accordance with FIG. 1, the preferred embodiment of the invention comprises an elongated frame 10 that has two driving sprockets 11 mounted at each end of the frame 10. The sprockets 11 are driven by a hydraulic motor 12 which is located at the inboard end of the engine and drives a pair of sprockets 11. The sprockets 11 may be driven by the motor 12 in either direction.

A tractor-type continuous track 14 is mounted upon the sprockets 11 by means of roller chain 13. Contrary to machines of the prior art, the embodiment of the invention does not require a motor 12 at each end of the machine to keep the track 14 taut. The track 14 is initially taut and does not require the inclusion of slack in order to swallow repeaters as was necessary in the prior art devices. The entire engine is mounted aboard the ship such that the track 14 is in alignment with the cable 41 which is being transported from the tanks in the ship's hold, over the side of the ship to the ocean floor.

Figure 2:
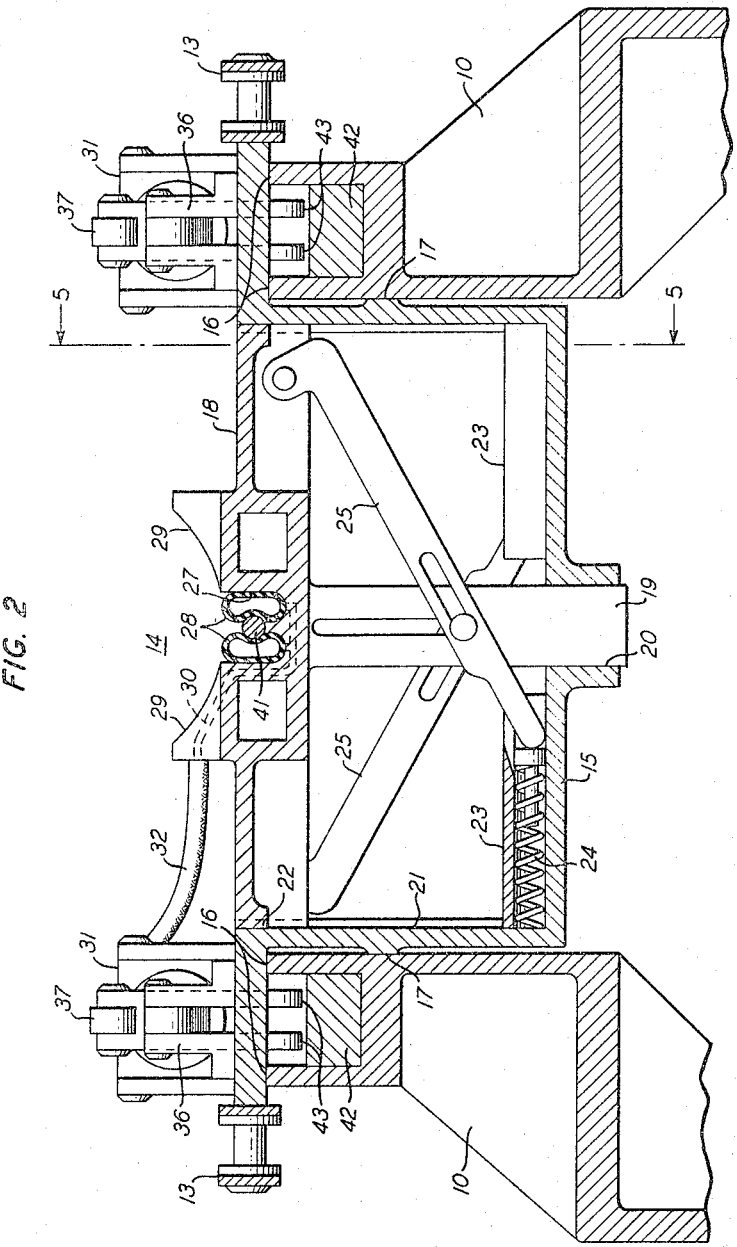
FIG. 2 is a section view taken generally along the line 2—2 of FIG. 4 showing the cradle as it is normally mounted in the bucket.
Figure 3:
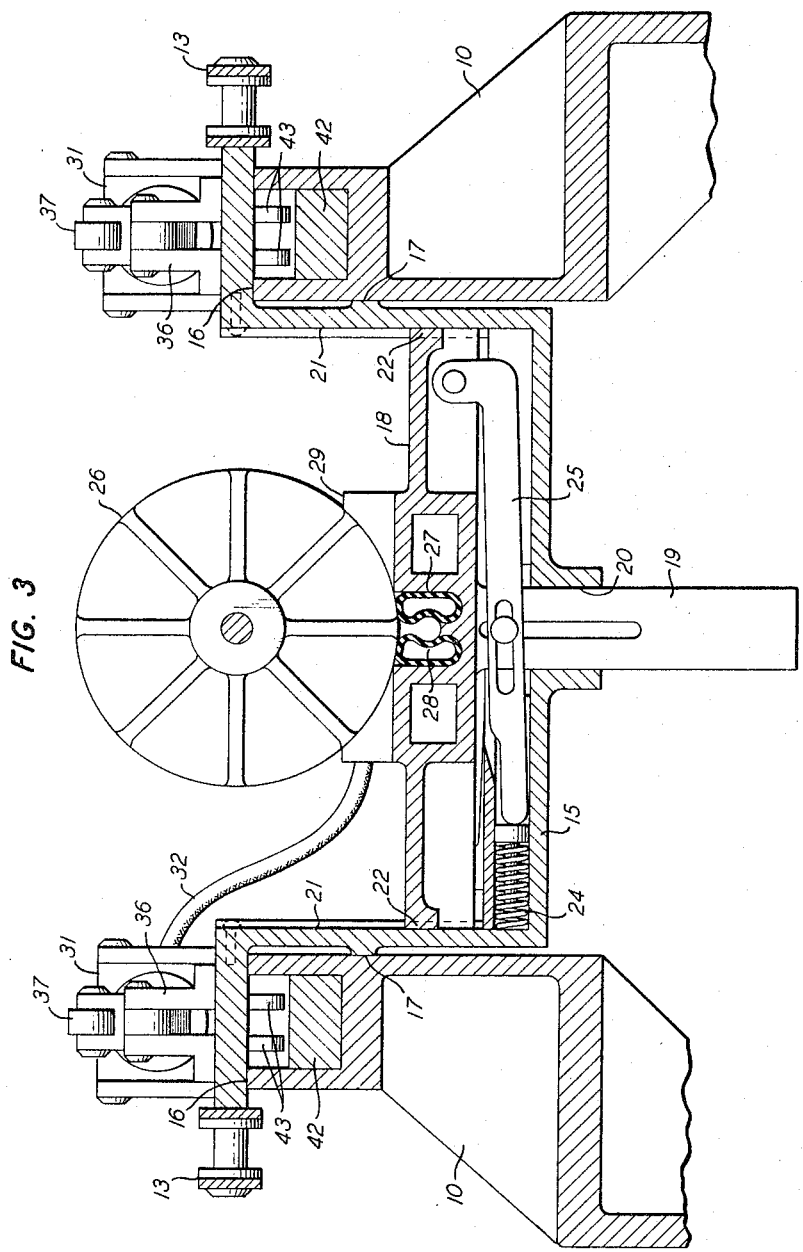
FIG. 3 is a section view taken generally along the same line as that of FIG. 2, showing the cradle as it is depressed into a bucket for passing a repeater.

In accordance with FIGS. 2 and 3 it may be seen that the track 14 is comprised of a plurality of buckets 15 which are interconnected by means of the roller chain 13. The buckets 15 are guided along the length of the machine by the sides of the frame 10 which act as guides. The top surfaces of the frame 10 are shaped to form bearing surfaces 16. These surfaces 16 support the bearing load of the track 14 and the cable 41 as the track 14 passes down the length of the engine. Each side of the bucket 15 includes a projection 17 which bears against the inside surface of the frame 10 to provide lateral guidance for the buckets 15 along the length of the engine.

Each bucket 15 further includes a cradle 18 which is depressible within the bucket 15 in a vertical direction. FIG. 2 shows the cradle 18 in its normal position and FIG. 3 shows the cradle 18 in a depressed position. An extension arm 19 fits through a hole 20 in the bottom of the bucket 15 and acts as a guide for the cradle 18. In addition, vertical slots 21 are included in each side of the bucket 15. The cradle 18 includes complementary projections 22 appropriately located on each side of the cradle 18. The projections 22 extend into the slots 21 to further guide the cradle 18 in a vertical direction.

The buckets 15 further include two spring chambers 23 in each of which a spring 24 is located. Pivotally mounted to the underside of the cradle 18 are two arms 25 that bear against the end of the springs 24 as shown in FIG. 2. Depression of the cradle 18 forces the ends of the arms 25 against the springs 24 which in turn compress the springs 24. The reaction of the springs 24 against the ends of the arms 25 urges the cradle 18 toward their normal positions shown in FIG. 2. The spring rate of the spring 24 is chosen so that the weight of a repeater 26 will be sufficient to depress the cradle 18 as shown in FIG. 3.

Figure 4:
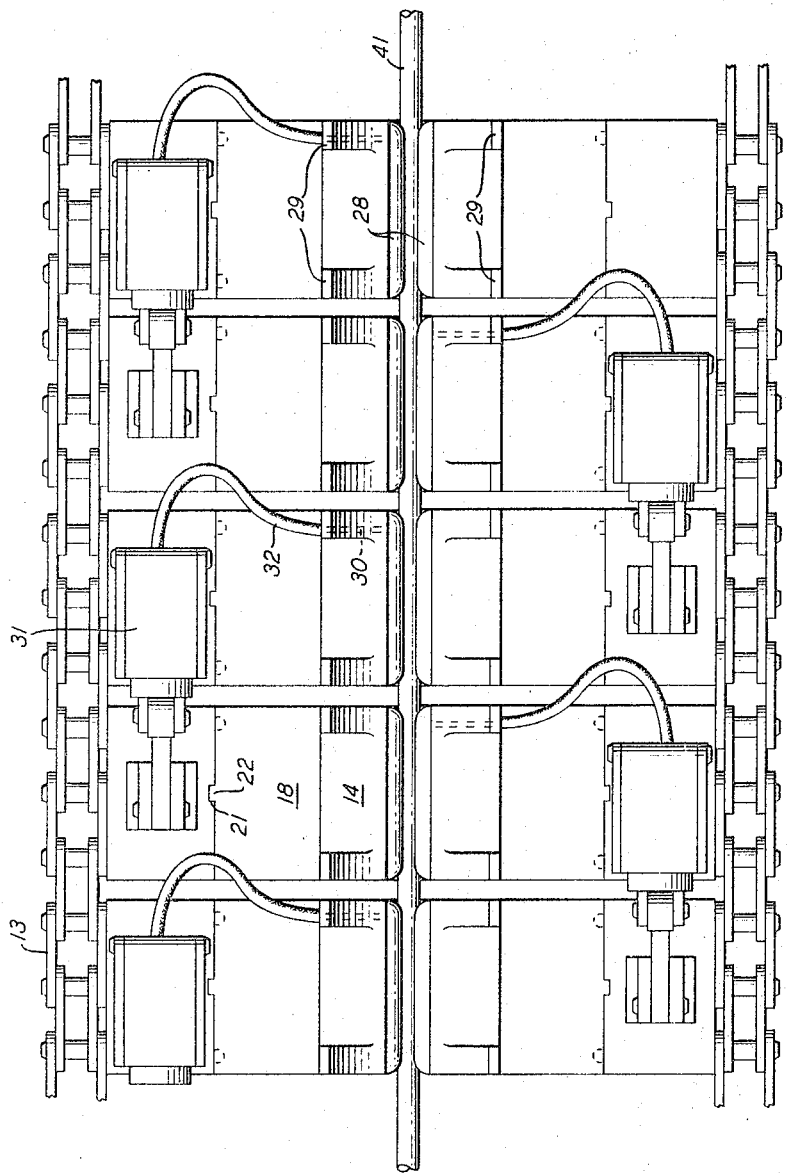
FIG. 4 is a top or plane view showing the interrelationship of the various components of the track.

The top surface of the cradle 18 includes a groove 27 in which are mounted two hydraulically actuated grippers 28. The grippers 28 are comprised of a pair of containers that may be expanded by forcing hydraulic fluid into their interiors. Each cradle 18 further includes four ears 29 which are shaped and adapted to support a repeater 26 when the latter is passed through the engine. One of the ears 29 includes hydraulic ducting 30 which is connected to a hydraulic cylinder 31 by means of a hydraulic line 32. The cylinders 31 may be designed to include accumulators if necessary and means for opening the cylinder when hydraulic pressures have been relieved. The cylinders 31 are alternately mounted upon the buckets 15 as shown in FIG. 4.

Figure 5:
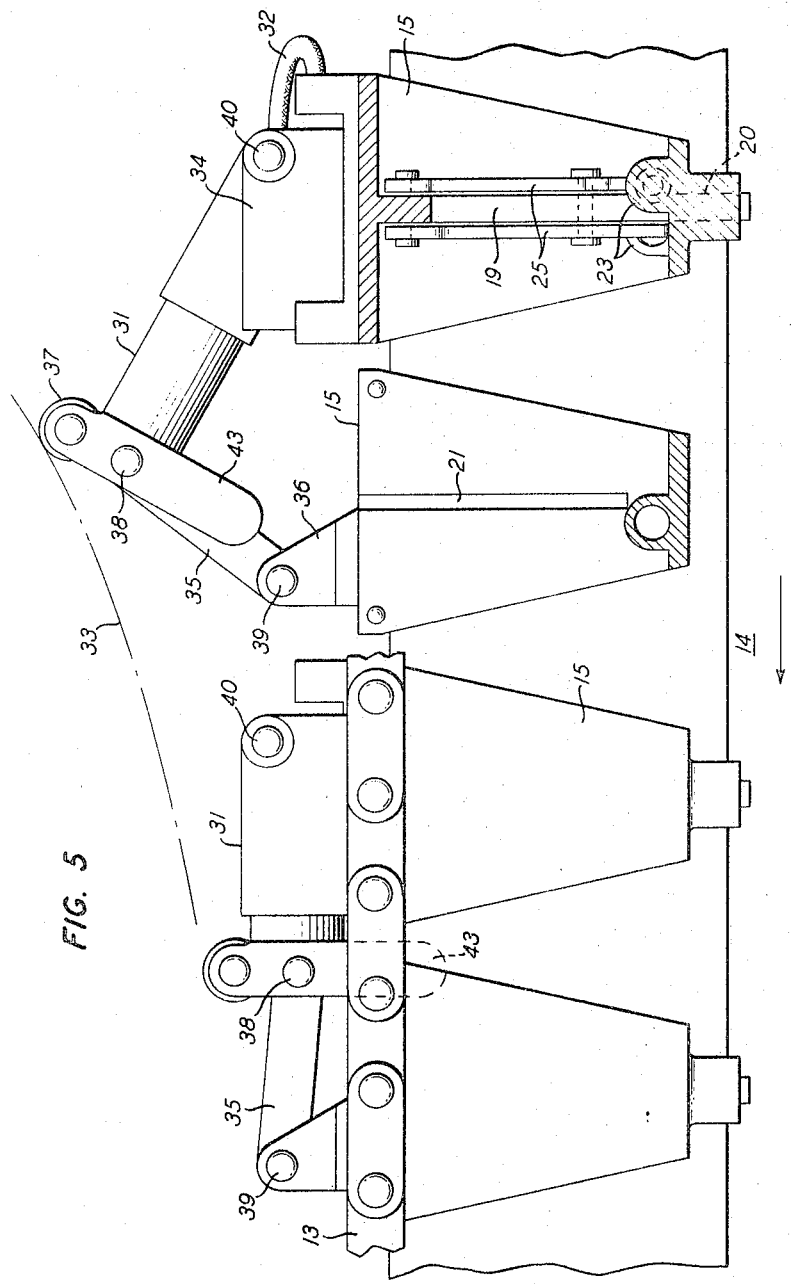
FIG. 5 is a view taken generally along the line 5—5 of FIG. 2 showing the hydraulic actuating of the gripper means.

The cylinders 31 are actuated by means of a cam 33 which is mounted upon the frame 10 as shown in FIG. 1. FIG. 5 shows how the cylinders 31 are actuated as each bucket 15 passes by the cam 33. The cylinders 31 are pivotally mounted to a fixed support 34 on each bucket 15 by means of a pivot point 40. In turn, the cylinder 31 is attached to the preceding bucket 15 by means of a link 35 and a fixed bracket 36. The link 35 rotates about the bracket 36 by means of a pivot point 39 and rotates about the cylinder 31 by means of a pivot point 38. Each cylinder 31 further includes two stop arms 43 and a roller or cam follower 37; the latter is adapted to contact the actuating cam 33.

As the track 14 progresses in the direction of the arrow shown in FIG. 5, the follower 37 of the cylinder 31 comes in contact with the cam 33. The shape of the cam 33 forces the follower 37 down toward the track 14. This in turn actuates the cylinder 31 which forces hydraulic fluid from the cylinder 31 through the line 32, through the ducting 30, and into the grippers 28. The cam 33 continues to push the follower 37 in a direction toward the track 14 until the pivot point 38 is pushed over center with respect to a line connecting pivot point 39 and pivot point 40 as shown in FIG. 5. The cylinders 31 are therefore placed in a locked position and will remain so until they are released. By locking the cylinders 31 hydraulic pressure is maintained in the grippers 28.

When hydraulic oil is forced into the grippers 28 by the actuation of the cylinders 31, the containers making up the grippers 28 are extended or expanded toward the cable 41. The cable 41 is squeezed between the grippers 28 and forces are thereby transferred from the engine to the cable 41 and vice versa. Although the forces generated by the squeezing grippers 28 may be small, they are exerted over the entire length of the machine and may therefore counterbalance considerably greater forces.

If elongation or deformation of the cable 41 occurs because of the longitudinal forces imposed upon it, these forces will not be focused upon short lengths of the cable 41 because as each portion of the cable 41 deforms or elongates, the forces are passed back to the pair of grippers 28 immediately following. This allows the longitudinal deforming forces to decay or dissipate in the engine.

Figure 6:
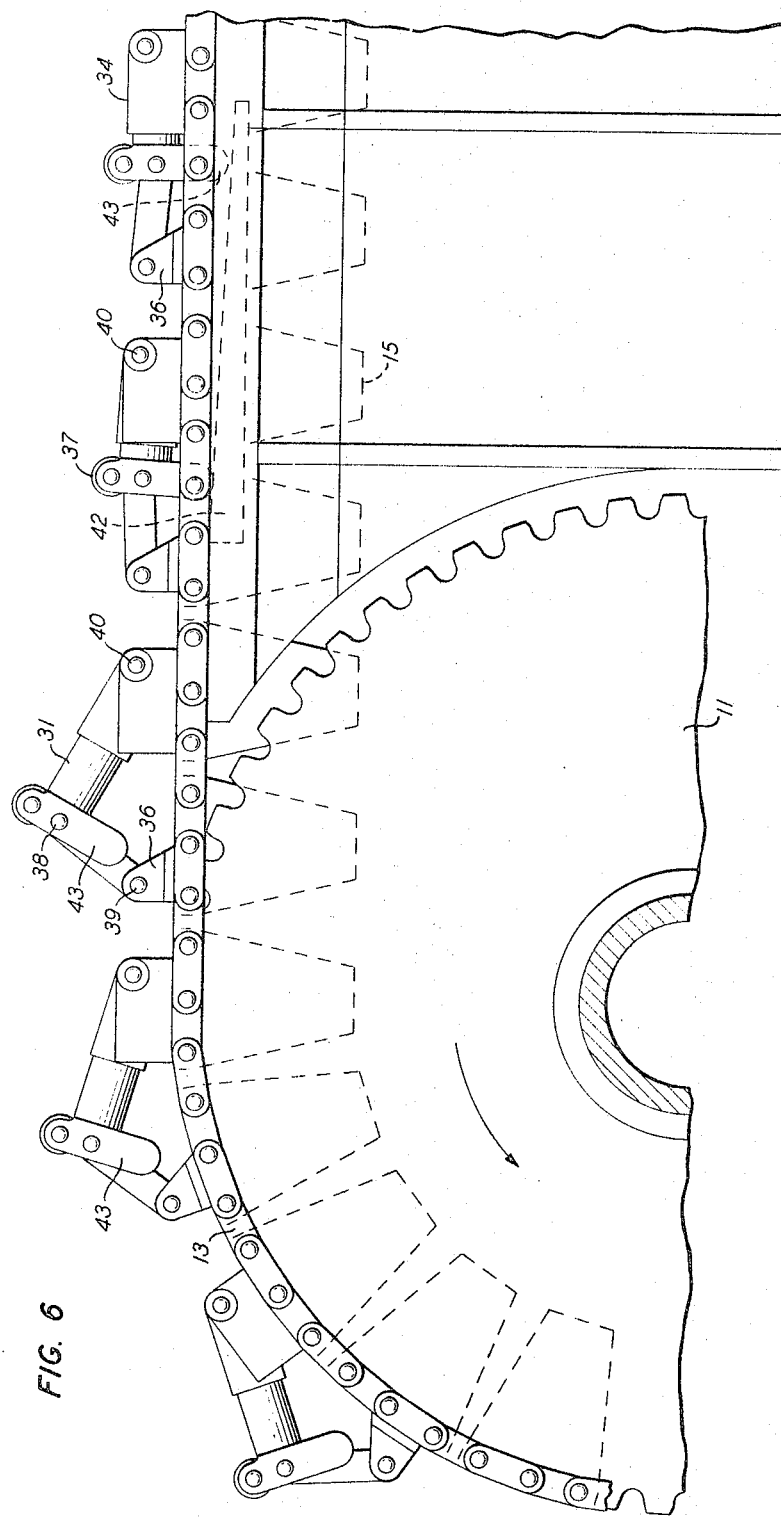
FIG. 6 is a side view showing the release of the gripper means.

As shown in FIG. 6, the frame 10 includes a pair of opening cams 42; one cam 42 is located on each side of the frame 10. The cams 42 are adapted to unlock or open the cylinders 31 and thereby to release the cable 41 from the grippers 28. The cams 42 must unlock the cylinders 31 at a point sufficient to allow the hydraulic oil to escape from the cylinders 31 before the grippers 28 reach the point of tangency between the track 14 and the sprockets 11. If the grippers 28 still grip the cable 41 at the point of tangency, the cable 41 may be damaged.

The cylinders 31 are opened or unlocked by the cams 42 when the bottom of the stop arms 43 comes into contact with a cam 42. The cam 42 forces the stop arms 43 up until the pivot point 38 is pushed over center with respect to a line connecting pivot points 39 and 40 as shown in FIG. 6. Once the hydraulic pressure has been relieved in each cylinder 31, the self-contained opening means continues to force the cylinder 31 to the open position where it remains until it comes in contact with the closing cam 33.

It is obvious to those skilled in the art that numerous changes and modifications may be made to the embodiment as it has been disclosed above without departing from the spirit and scope of the invention.

What is claimed is:

1. An engine for handling cable that includes repeaters, said engine comprising a single continuous track and a single power means for controlling the movement of said track, said track comprising a plurality of depressible cradles interconnected to each other by roller chain, said cradles including a U-shaped channel in their top surfaces for receiving said cable, each wall of said U-shaped channel including an expandable sack, said sack being hydraulically expandable against said cable to grip said cable and hydraulically contractable to release said cable, said track further including a plurality of hydraulic cylinders for hydraulically expanding and contracting said sacks, said cradles being depressible with respect to said roller chain by the weight of a repeater upon said U-shaped channel, said engine further including means for actuating said hydraulic cylinders.

2. An engine for handling cable that includes repeaters, said engine comprising a single continuous track, power means for controlling the movement of said track, a plurality of buckets mounted in a continuous train along said track, a cradle slideably mounted in each bucket and having a normally extended position to receive said cable, cable gripping means mounted on each side of said cradle, means for actuating said cable gripping means when said cable enters said track and for deactuating said cable gripping means when said cable leaves said track, each said cradle and associated gripping means depressing away from said extended position in response to the weight of a repeater, and means for returning said cradle to said extended position upon passing of said repeater.

3. An engine in accordance with claim 2 wherein said cable gripping means comprises inflatable bags, and wherein said actuating means are hydraulic cylinders connected to each said bag.

References Cited by the Examiner
UNITED STATES PATENTS

| | | | |
|---|---|---|---|
| 1,703,777 | 2/1929 | Pernot. | |
| 2,924,328 | 2/1960 | Lidderdale. | |
| 2,981,454 | 4/1961 | Dickinson et al. | 226—172 |
| 3,010,631 | 11/1961 | Gretter | 226—172 |
| 3,015,427 | 1/1962 | Kessler | 226—172 |
| 3,032,247 | 5/1962 | Lechner | 226—173 |

M. HENSON WOOD, JR., *Primary Examiner.*

J. N. ERLICH, *Assistant Examiner.*